US007215678B1

(12) United States Patent
Ahlfors et al.

(10) Patent No.: US 7,215,678 B1
(45) Date of Patent: May 8, 2007

(54) METHOD AND APPARATUS FOR DISTRIBUTION OF BANDWIDTH IN A SWITCH

(75) Inventors: Ulf Ahlfors, Kävlinge (SE); Anders Fyhn, Malmö (SE); Peter Tufvesson, Lund (SE)

(73) Assignee: Switchcore, A.B., Lund (SE)

( * ) Notice: Subject to any disclaimer, the term of this patent is extended or adjusted under 35 U.S.C. 154(b) by 0 days.

(21) Appl. No.: 09/546,494

(22) Filed: Apr. 10, 2000

(51) Int. Cl.
*H04L 12/28* (2006.01)
(52) U.S. Cl. ...................................... 370/412; 370/230
(58) Field of Classification Search ................ 370/230, 370/230.1, 235, 395.4, 412, 468, 413, 414, 370/415, 416
See application file for complete search history.

(56) References Cited

U.S. PATENT DOCUMENTS

| | | | |
|---|---|---|---|
| 5,381,413 A | | 1/1995 | Tobagi et al. |
| 5,432,790 A | | 7/1995 | Hluchyj et al. |
| 5,583,857 A | | 12/1996 | Soumiya et al. |
| 5,742,594 A | | 4/1998 | Natarajan |
| 5,748,629 A | * | 5/1998 | Caldara et al. ............. 370/389 |
| 5,764,641 A | * | 6/1998 | Lin ............................ 370/412 |
| 5,768,257 A | | 6/1998 | Khacherian et al. ........ 370/229 |
| 5,828,653 A | * | 10/1998 | Goss ........................... 370/230 |
| 5,917,822 A | | 6/1999 | Lyles et al. |
| 6,072,800 A | * | 6/2000 | Lee ............................ 370/412 |
| 6,104,700 A | * | 8/2000 | Haddock et al. ............ 370/235 |
| 6,122,252 A | * | 9/2000 | Aimoto et al. .............. 370/235 |
| 6,144,636 A | * | 11/2000 | Aimoto et al. .............. 370/229 |
| 6,292,465 B1 | * | 9/2001 | Vaid et al. ................... 370/230 |

(Continued)

FOREIGN PATENT DOCUMENTS

EP  0 878 937 A1  11/1998

(Continued)

OTHER PUBLICATIONS

Bondi, A.; *An analysis of Finite Capacity Queues with Priority Scheduling and Common or Reserved Waiting Areas*, Computers Opns, Res. vol. 16, No. 3, pp. 217-233 (1989).

(Continued)

*Primary Examiner*—Huy D. Vu
*Assistant Examiner*—Christine Ng
(74) *Attorney, Agent, or Firm*—Pillsbury Winthrop et al (57) ABSTRACT

The invention relates to a method and an apparatus for distribution of bandwidth in a switch or router. More particularly, the invention relates to a scheduler and an associated algorithm for distributing bandwidth over data traffic directed to output ports and received in various traffic classes and flows. The switch has a switching fabric. Preferably, the bandwidth scheduler is located before output queues, and the method includes: receiving a stream of data from the switching fabric; subjecting the stream to a decision making algorithm in the bandwidth scheduler resulting in that the stream is forwarded or interrupted (accepted or rejected). Preferably, the stream of data includes identifiable data packets and the decision making algorithm in the bandwidth scheduler results in the data packet being accepted or rejected. The bandwidth scheduler may be located before the output queues leading to early discarding of packets and efficient use of output buffer memory. The algorithm includes logical rules operating on counters and variables recording the accepted traffic to implement the bandwidth distribution. The algorithm enables weighted distribution and short term as well as long term fairness.

36 Claims, 2 Drawing Sheets

U.S. PATENT DOCUMENTS

| | | | |
|---|---|---|---|
| 6,469,982 B1 * | 10/2002 | Henrion et al. | 370/230 |
| 6,549,938 B1 * | 4/2003 | Kilkki et al. | 709/207 |
| 6,570,883 B1 * | 5/2003 | Wong | 370/412 |
| 6,628,609 B2 * | 9/2003 | Chapman et al. | 370/229 |
| 2002/0097736 A1 * | 7/2002 | Cohen | 370/419 |
| 2003/0103450 A1 * | 6/2003 | Chapman et al. | 370/229 |

FOREIGN PATENT DOCUMENTS

| | | |
|---|---|---|
| GB | 2311687 A | 10/1997 |
| JP | 10-215253 | 8/1998 |
| WO | WO 97/04564 | 2/1997 |
| WO | WO 97/14240 | 4/1997 |

OTHER PUBLICATIONS

Conway, A, et al.; *Weighted Fair Blocking Mechanisms for Discrete-Time Multiplexing*; IEEE, 8d.2.1 pp. 1045-1053, 0743-166X (1996).

Gelenbe, E, et al.; *Approximate Analysis of Coupled Queueing in ATM Networks*, IEEE Communications Letters, vol. 3. No. 2, pp. 31-33, (1999).

Ghani, N. et al.; *An Enhanced Distributed Explicit Rate Allocation Algorithm for ABR Services*, ITC 15, Elsevier Science B.V. pp. 119-1128, (1997).

Hung, A, et al.; *Bandwidth Scheduling for Wide-Area ATM Networks Using Virtual Finishing Times*, IEEE/ACM Transactions on Networking, vol. 4, No. 1, pp. 49-54, (1996).

Racz, A., et al.; *Weighted Fair Early Packet Discard at an ATM Switch Output Port*; IEEE.

Saha, D., et al., *Carry-Over Round Robin: A Simple Cell Scheduling Mechansim for ATM Networks*; IEEE 5d. 1.1 pp. 630-637 (1996).

—, "Wire Speed Quality of Service over Ethernet (Part 2)," Chip Center.com, pp. 1-8, Jul. 2001.

Goyal, et al., "Fair Airport Scheduling Algorithms," Dept. of Computer Sciences, Univ. of Texas, IEEE, pp. 257-265, 1997.

Hou, et al., "ATM ABR Traffic Control with a Generic Weight-Based Bandwidth Sharing Policy: Theory and a Simple Implementation," IEICE Trans. Communication, vol. E81-B, No. 5, pp. 958-972, May 1998.

Wu, et al., "Improved Virtual Queueing and Dynamic EPD Techniques for TCP over ATM," Mass. Institute of Tech., IEEE, pp. 212-219, 1997.

Guijaro, et al., "Guaranteeing Fairness and Protection in ABR by means of Fair Queueing," Dept. of Communications, Universidad Politecnica de Valencia, IEEE, pp. 22-31, 1999.

Zhang, H., "Service Disciplines for Guaranteed Performance Service in Packet-Switching Networks," Proceedings of the IEEE, vol. 83, No. 10, pp. 1374-1396, Oct. 1995.

* cited by examiner

METHOD AND APPARATUS FOR DISTRIBUTION OF BANDWIDTH IN A SWITCH

FIELD OF THE INVENTION

The present invention relates to a method and an apparatus for distribution of bandwidth in a switch or router. More particularly, the invention relates to a scheduler and an associated algorithm for distributing bandwidth over data traffic directed to output ports and received in various traffic classes and flows. The bandwidth scheduler may be located before the output queues leading to early discarding of packets and efficient use of output buffer memory. The algorithm includes logical rules operating on counters and variables recording the accepted traffic to implement the bandwidth distribution. The algorithm enables weighted distribution and short term as well as long term fairness.

STATE OF THE ART

The paper András Rácz, Gábor Fodor, Zoltán Turányi: *Weighted Fair Early Packet Discard at an ATM Switch Output Port*, 0-7803-55420-6/99 1999 IEEE discloses similar ideas on fairness and bandwidth utilisation in an ATM switch. A predefined weighted share is associated with a data stream. An algorithm attempts to provide this share of the bandwidth for the streams in the long time average. However, the paper is silent on the division of the scheduler in bandwidth and latency scheduling and also on many other aspects of the present invention.

One object of the present invention is to split the scheduler into two parts, a bandwidth scheduler and a latency scheduler. Bandwidth scheduling is performed before packets arrive in the output queues. Packets eligible for dropping are pro-actively blocked. Thus, it is no longer necessary to differentiate flows and/or traffic flows in order to allocate bandwidth and the output queues can be used solely for latency priorities.

SUMMARY OF THE INVENTION

These and other objects of the invention are achieved by the present invention which provides a method and an apparatus for bandwidth scheduling in a switch comprising a switching fabric. In accordance with a first embodiment the bandwidth scheduler is located before output queues, and the method comprises: receiving a stream of data from the switching fabric; subjecting the stream to a decision making algorithm in the bandwidth scheduler resulting in that the stream is forwarded or interrupted (accepted or rejected). Preferably, the stream of data includes identifiable data packets and the decision making algorithm in the bandwidth scheduler results in that the data packet is accepted or rejected.

In accordance with further embodiments, a number of logic rules and operations are run through including:

a limit ($BWP_{max}$) is set on the maximum accepted bandwidth per port, a virtual queue is associated with each port, and a flag is set in dependence of the port queue length;

a limit ($BWTC_{max}$) is set on the maximum accepted bandwidth per traffic class, a virtual queue is associated with each traffic class, and a flag is set in dependence of the traffic class queue length;

the bandwidth is distributed in accordance with the Max-Min algorithm;

each traffic class is guaranteed a bandwidth up to a limit ($BWTC_{min}$);

a weight (WTC) is associated with each traffic class, so that the algorithm automatically prioritises certain traffic classes;

for each traffic class, a backlogging counter (BL) keeps track of how many packets are accepted in relation to the other traffic classes, so that if a previously idle traffic class becomes active, the traffic class is compensated by distributing more bandwidth to this traffic class;

if one traffic class is particularly aggressive or active, it gives up a part of its accepted bandwidth.

In accordance with another embodiment the bandwidth scheduler is located after output queues.

One advantage of the present invention is that bandwidth is distributed much earlier, resulting in smaller buffer requirements and smaller buffer usage fluctuations. Also, the algorithm is totally independent of the number of output queues per port, while algorithms like Weighted Round Robin and Weighted Fair Queuing need as many queues as possible.

BRIEF DESCRIPTION OF THE DRAWINGS

The invention will be described below with reference to the accompanying drawings, in which.

DETAILED DESCRIPTION OF PREFERRED EMBODIMENTS

Generally, the task of a scheduler is to forward or discard traffic received from a switching fabric to output ports and respective output links. The concept of Quality of Service has been introduced to define the quality of the operation of the switch. Four different aspects of Quality of Service may be studied. First is latency, the delay the flow is experiencing through the device. Second there is jitter, or latency variations. Third there is bandwidth distribution and fourth is loss probability. The present invention is mainly related to bandwidth distribution.

Figure 1:
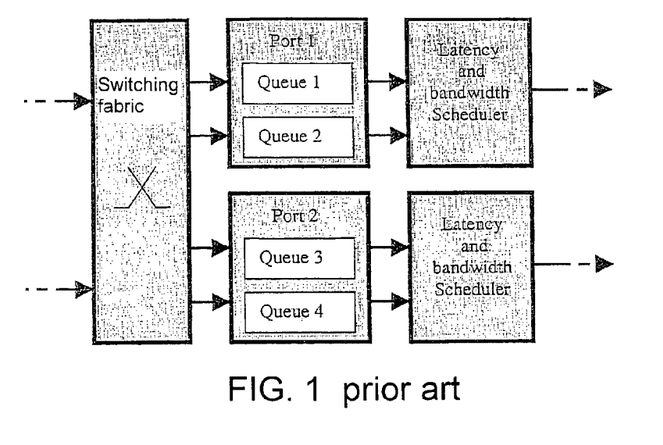
FIG. 1 is a block diagram of a prior art scheduler.

In FIG. 1, the prior art architecture with a combined latency and bandwidth scheduler is shown. Traffic is switched by a switching fabric and distributed on ports which may have a number of queues each. The scheduler is located after the output queues. Examples of this kind of scheduler are Round Robin, Weighted Round Robin and Weighted Fair Queuing. Here the queues are used to separate different flows and/or traffic classes so that the scheduler can differentiate them. This type of architecture uses common techniques like tail-drop or push-out to drop packets.

Figure 2:
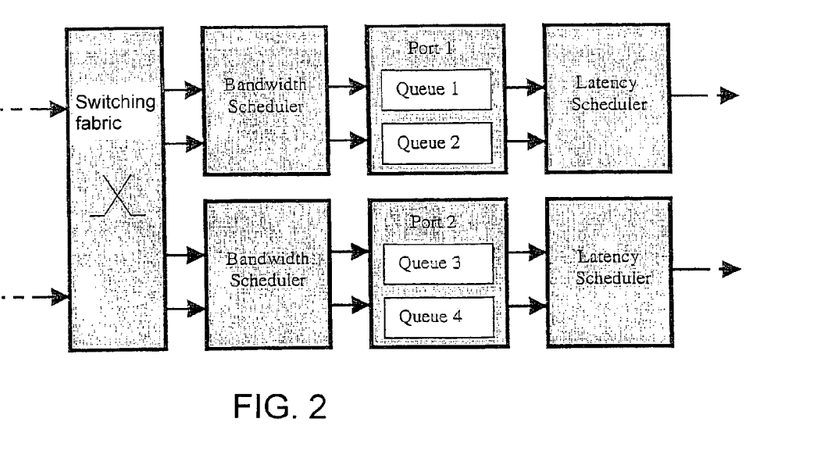
FIG. 2 is a block diagram of a split scheduler architecture according to the present invention.

In FIG. 2 the scheduler architecture according to the present invention is shown. The main difference is that the scheduler is split into two parts, a bandwidth scheduler and a latency scheduler. Bandwidth scheduling is performed before packets arrive in the output queues. Packets eligible for dropping are pro-actively blocked. Thus, it is no longer necessary to differentiate flows and/or traffic flows in order to allocate bandwidth and the output queues can be used solely for latency priorities. One advantage is that bandwidth is distributed much earlier, resulting in smaller buffer requirements and smaller buffer usage fluctuations. Also, the algorithm is totally independent of the number of output queues per port, while algorithms like Weighted Round Robin and Weighted Fair Queuing need as many queues as possible.

Any latency scheduler can work together with the bandwidth scheduler according to the present invention and strict priority is proposed.

Another aspect of the present invention is the bandwidth scheduler algorithm as such. The algorithm aims at a fair distribution of the bandwidth between traffic classes and flows at each port. The algorithm takes into account many factors, such as the bandwidth demand of each flow, and short term and long term fairness as will be described more in detail below. The algorithm as such is general and may in principle be located before or after the output ports.

A fair bandwidth distribution can be accomplished in many different ways. Also fairness has different definitions and could be measured in various ways. Fairness could be defined as distributing a bandwidth equal to the wanted bandwidth divided by the sum of the wanted bandwidth. This can be accomplished by several Round Robin schemes. However, in the present invention the Max-Min algorithm is preferred. As the name indicates, this algorithm maximizes the minimum flow. This is considered the fairest algorithm, if all flows can benefit equally to increased bandwidths.

Figure 3:
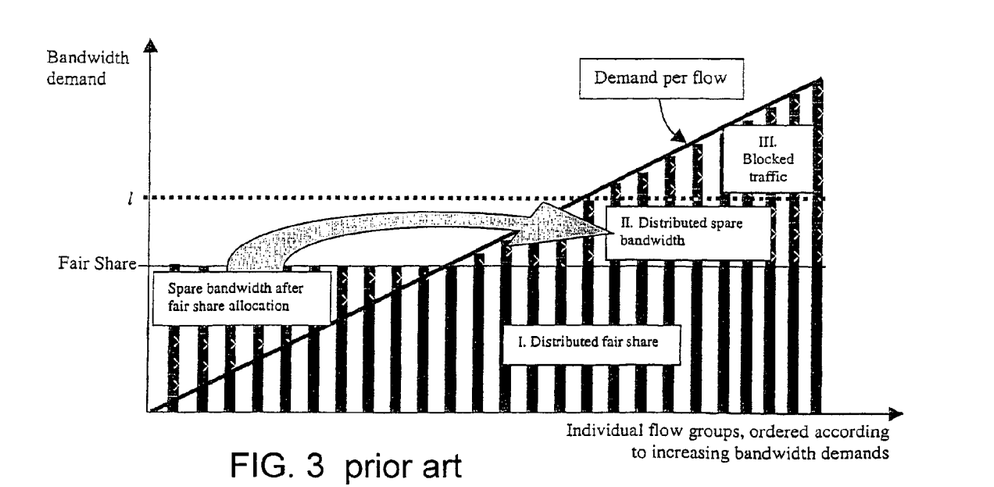
FIG. 3 is a diagram of bandwidth distribution in accordance with the prior art Max-Min algorithm.

The Max-Min algorithm is illustrated in FIG. 3. If the basic concept is that equal bandwidth is equal utility, then it is most fair to find a limit l where all flows that are offering less than l experience no losses. Flows that are offering more traffic only get bandwidth equal to l, no matter how much bandwidth they are offering. As seen from the figure, a fair share is defined for all flows. Since the fair share is not used by all flows, a spare bandwidth remains after fair share allocation. This spare bandwidth is distributed on flows offering more traffic than the fair share, up to the limit l. Flows offering more traffic than the limit l have this part of the traffic blocked.

The present invention proposes a further extension of the Max-Min algorithm:

First, all flows are not equal. Each flow is associated with a weight such that the bandwidth is distributed in relation to the weight of each flow. Preferably, each traffic class has a weight and the flows within a traffic class are treated equally.

Second, some flows can be guaranteed bandwidth. In other words, no data packets are lost until the flow exceeds the guaranteed bandwidth limit.

Third, some flows can be restricted to certain bandwidth maximum. Under no circumstances should a maximized flow get more bandwidth than its limit, even if the line will be left under-utilized.

Fourth, a short term fairness is introduced between flows. If a flow is bursty, i.e. more packets are sent than the accepted bandwidth, this should be accepted for a short period of time to make the scheduling flexible. The other flows will be compensated in the future.

Fifth, a long term fairness between flows is also introduced. If a flow is aggressive for a period it will be forced to give up some of its accepted bandwidth to the other flows as "charity". If a flow is silent for a time period, it will be compensated in the future by means of the accumulated charity, so that the flow is allocated more bandwidth than the competing flows. However, the time period should be limited and also the accumulated amount of compensation should be limited.

The implementation of the algorithm is described more in detail below.

The bandwidth scheduler generally receives a stream of data. The stream may be organized into cells or data packets according to different protocols, such as TCP (Transport Control Protocol) and UDP (User Datagram Protocol). The term data packet and similar in this application is intended to encompass any kind of data entity. It is also practical to use the term flow which can have different meanings under different circumstances. If e.g. TCP/IP is used the flow may be an application flow (address and port on both source and destination) or a host flow (only address of source and destination). It is assumed that each flow may be classified with regard to its identity with respect to the following categories.

The traffic is distributed on the respective ports. This is straightforward but usually the operator puts a limit on the maximum accepted bandwidth per port.

Each port may accommodate a number of traffic classes. All flows are categorised into classes. A class is normally based upon some network protocols and/or network hosts, but as regards the present invention the classes can be based upon any criteria. The classes must be fully disjoint and the invention does not have to be enabled for all classes. All flows within a traffic class are equal. If this is undesirable, a traffic class needs to be split up into two or more classes.

In principle, an application flow is the smallest unit treated by the scheduler. However, since the number of application flows is very large and seems to be growing at a rapid rate, the invention proposes to group application flows together by means of a hash function into a set of hashed groups which in this application by definition will be referred to as flow groups. The hashing function is stationary and deterministic in a way that all packets belonging to one flow always must be mapped into the same flow group. If flow groups are used, the invention does not distinguish between the flows within the flow group.

The physical implementation of the invention resides in a program stored in the scheduler either before or after the output queues. The program contains the algorithm defining logic rules operating on constants, configuration parameters and various variables and counters. The incoming data stream is stored in a buffer while the algorithm operates on some part of the data stream, for instance headers of individual data packets. The extracted information or header is processed through the algorithm and the result is that the data stream is forwarded or interrupted or, in case of a data packet, the packet is accepted or rejected. Various counters keep track of the accepted traffic for each traffic class and flow group. Also, the variables and counters are updated at regular intervals. The process is described in further details below, with reference to the various parts of the algorithm.

A number of parameters and variables are used to implement the alogorithm. They are listed in the tables below showing the hierarchical order of the variables and the rules for increasing, decreasing as well as updating the variables.

Configuration parameters

| Port | Traffic class | Flow group |
|---|---|---|
| $BWP_{max}$ | $BWTC_{max}$ | |
| | $BWTC_{min}$ | |
| | $WTC$ | |

$BWP_{max}$ maximum bandwidth per port
$BWTC_{max}$ maximum bandwidth per traffic class
$BWTC_{min}$ minimum bandwidth per traffic class
$WTC$ weight per traffic class

Port counters and variables

| Name | Logic | Increment per packet sent/discarded | Update per time unit |
|---|---|---|---|
| VQLP | | + packet length | $- BWP_{max}$ |
| $TCP_{max}$ | = max (all TCs of port) | — | — |
| $BLP_{max}$ | = max (all BLs of port) | — | — |
| CH | | + packet length × give factor, if given<br>− packet length × WTC, if taken | × decay factor (e.g. 15/16) |

VQLP virtual queue length per port
$TCP_{max}$ maximum traffic class variable per port
$BLP_{max}$ maximum backlogging variable per port
CH charity counter per port

Traffic Class counters and variables

| Name | Logic | Increment per packet sent | Update per time unit |
|---|---|---|---|
| TC | | + packet length × WTC | $- BWTC_{min} \times WTC$ |
| $FG_{max}$ | = max (all FGs of TC) | — | — |
| BL | 0 < BL < 256 kB | + packet length × WTC | $- BWTC_{min} \times WTC$ |
| VQLTC | | + packet length | $- BWTC_{max}$ |

TC traffic class counter
$FG_{max}$ maximum flow group variable per traffic class
BL backlogging counter per traffic class
VQLTC virtual queue length per traffic class

Flow Group counter

| Name | Logic | Increment per packet sent | Update per time unit |
|---|---|---|---|
| FG | | + packet length | — |
| FG | flow group counter | | |

To illustrate the invention it is assumed that the data stream arrives in packets carrying information about flow identity. Each port receives its respective part of the data stream. The scheduler is configured to limit the amount of accepted bandwidth per port by means of a configuration parameter $BWP_{max}$ (maximum bandwidth per port). To keep track of the accepted bandwidth for each port a virtual queue is implemented. In other words, a counter VQLP (virtual queue length of the port) is increased with the packet length when the port accepts a packet. By updating or refreshing the counter VQLP in each time unit by subtracting the configuration parameter $BWP_{max}$, the limit is maintained automatically. If the virtual queue grows too long (VQLP>constant), packets will be rejected.

As mentioned above, each port also usually accepts traffic in various traffic classes. Each traffic class has a virtual queue length counter TC to keep track of the accepted bandwidth in each traffic class. A variable $TCP_{max}$ is set at a value equal to the maximum of the traffic class counters for the port in question, to keep a record of the traffic class counter having the highest value. The counter TC is increased with the packet length when the traffic class accepts a packet. Also, the counter TC is updated or refreshed each time unit by subtracting a configuration parameter $BWTC_{min}$ (see below). A traffic class with the ratio $TC/TCP_{max}<$a constant, e.g. 0.75, is considered fair, while more busy classes are considered unfair. If the traffic class is fair, an offered packet may be accepted. If the virtual queue grows too long (TC>constant), unfair packets will be rejected. For the most aggressive traffic class ($TC=TCP_{max}$) offered packets are rejected when the virtual queue is even shorter. In this way the counter TC assists in implementing the basic algorithm Max-Min for the traffic classes.

Also each flow group has a virtual queue counter FG keeping track of how many packets are accepted. Each traffic class has a variable $FG_{max}$ which is set equal to the maximum value of the counters FG belonging to this traffic class. A flow group with the ratio $FG/FG_{max}<$a constant. e.g. 0.75, is considered fair, while more busy flow groups are considered unfair. For the most aggressive flow group ($FG=FG_{max}$) offered packets are rejected when the virtual queue is even shorter. In this way the counter FG assists in implementing the basic algorithm Max-Min for the flow groups.

The present invention involves a further extension of the Max-Min algorithm with the additions mentioned above. The additions operate in parallel and independently of one another. Not all the additions have to be implemented but may be combined in various ways.

To enable prioritizing of certain traffic classes over others, weights are associated with each traffic class. A configuration parameter WTC (weight traffic class) is set when initializing the scheduler. When packets are accepted the respective counters are increased in a weighted manner, so that the algorithm automatically prioritizes certain traffic classes. Thus, the counter TC is increased with the packet length multiplied by the weight WTC when the traffic class accepts a packet. Of course, the weight function may be disabled by setting all weights WTC to unity (1).

Each traffic class may be associated with a guaranteed bandwidth. A configuration parameter $BWTC_{min}$ (bandwidth traffic class minimum) is set when initializing the scheduler. If the traffic class in question offers bandwidth less than the guaranteed bandwidth, it will always be accepted. Of course, the total of the guaranteed bandwidth for all traffic classes must be less than or equal to the maximum bandwidth of the port $BWP_{max}$.

The counter TC is updated or refreshed each time unit by subtracting the configuration parameter $BWTC_{min}$ multiplied by the weight WTC. This is to account both for the weight and guaranteed bandwidth. This subtraction results in that all traffic below $BWTC_{min}$ for this class will be accepted. If the counter TC grows larger than $BWTC_{min}$ the traffic will compete equally with the other flows.

A maximum bandwidth may be associated with each traffic class. A configuration parameter $BWTC_{max}$ (bandwidth traffic class maximum) is set when initializing the scheduler. This parameter limits the amount of accepted traffic in a traffic class, irrespective of existing spare capacity. Another virtual queue is associated with each traffic class by means of a counter VQLTC (virtual queue length per traffic class) counting the number of accepted packets. The counter VQLTC is updated or refreshed each time unit by subtracting the configuration parameter $BWTC_{max}$. Thus, the limit is maintained automatically. If the virtual queue grows too long (VQLTC>constant possibly plus a tolerance constant to allow for different packet sizes), packets will be rejected.

To accommodate bursty traffic but still distribute bandwidth in a fair way seen over a short term, a counter is introduced for each traffic class to keep a record of the amount of accepted traffic for one traffic class in relation to the other traffic classes belonging to the same port. The counters are called backlogging counters BL. Also, one variable $BLP_{max}$ (backlogging port max) stores the maximum of the back-logging counters for the traffic classes of each port. A traffic class with the ratio $BL/BLP_{max}$<a constant, e.g. 0.75, is considered fair, while more busy classes are considered unfair. The counter BL is increased with the packet length multiplied by the weight WTC when the traffic class accepts a packet. The counter BL is updated or refreshed each time unit by subtracting the configuration parameter $BWTC_{min}$ multiplied by the weight WTC. In this way the counter BL assists in implementing the basic algorithm Max-Min together with the counters TC and FG. This counter BL is associated with the concept of short term fairness, but the backlogging counter BL is also important for the weight function.

If a traffic class is idle for some time, the spare bandwidth is distributed among the active flows. When the idle flow becomes active again the flow is compensated by distributing more bandwidth to this flow. On the other hand, the now active class should not be allowed to monopolize the link in order to accomplish this. Instead this should be a slow process, given the quiet class has a fraction more bandwidth until the flows are once again treated equally. On the other hand, if one traffic class is particularly aggressive or active, it should give up a part of its accepted bandwidth as "charity". Both these situations are associated with the concept of long term fairness. This feature is associated with a counter CH (charity) for each port. When a packet is accepted in a traffic class having the maximum accepted bandwidth, in other words, the variable TC equals $TCP_{max}$, the packet may instead be discarded, if it is not unfair with regard to other criteria (depending on the queue length). Then, the counter CH is increased with a configurable fraction of the accepted packet length (+packet length×give factor). The other traffic class counters (TC and BL) are incremented as if the packet was accepted. On the other hand, when a packet is sent by one of the other traffic classes of which the counter $TC \neq TCP_{max}$, and when the packet is decided to be rejected in accordance with the other logic rules, the traffic class can use the charity function to force the packet to be accepted. Then, the charity counter CH is decreased with the packet length multiplied with the weight of the respective traffic class (−packet length×WTC). Thus, value of the charity counter CH will vary and reflects if one traffic class is much more aggressive than the others. If the traffic classes are more or less equal, then the charity counter should preferably decay slowly. Thus, the counter CH is updated or refreshed each time unit by multiplying with a decay factor, e.g. $15/16$.

Figure 4:
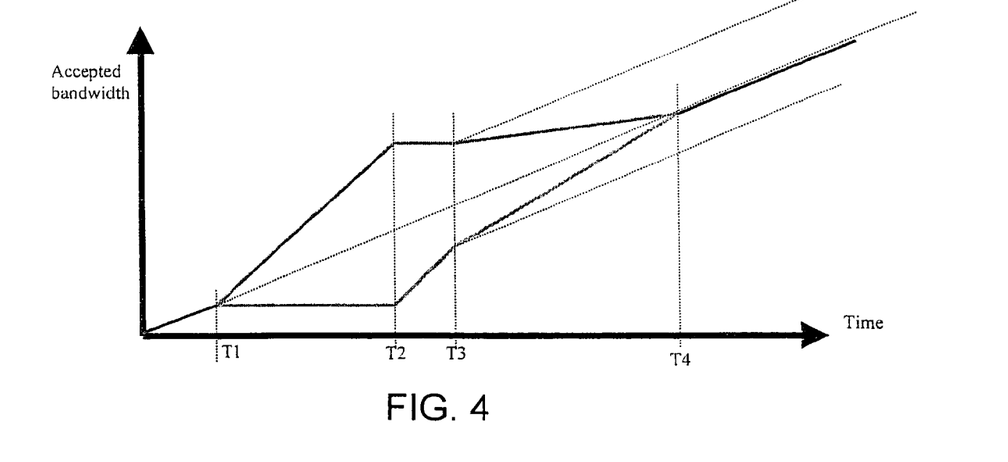
FIG. 4 is a diagram of accepted bandwidth using the backlogging and charity counters according to the present invention.
Figure 5:
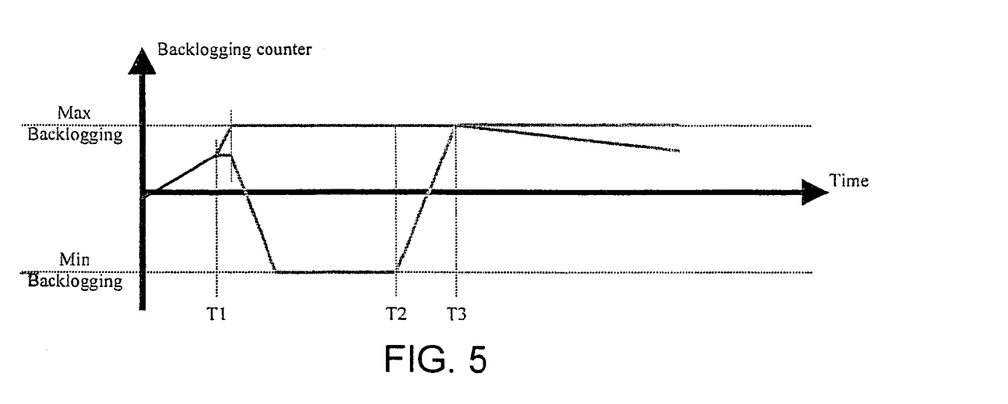
FIG. 5 is a diagram of the backlogging counter associated with FIG. 4.

FIG. 4 is a first diagram showing the total accepted bandwidth and FIG. 5 is a diagram showing the backlogging counters for two flows A and B. The backlogging counter is increased every time a packet is accepted, such as shown in FIG. 4. The backlogging counter is limited to a fixed value, e.g. ±128 kB. If one backlogging counter for a flow reaches the upper limit, all the counters belonging to this port are decreased in order to maintain the internal difference. If one backlogging counter for a flow reaches the lower limit, this counter remains at the lower limit (but the other counters are not affected). This way only the near past is remembered. Hence the term short term fairness. Now we have two variables (backlogging counter and charity counter) measuring fairness in two different time scales.

Up to T1 two flows, A and B, are active. They are considered equal in all respects and offer the same amount of bandwidth to the switch. Between T1 and T2 only flow A is active, while flow B is idle. After T2 both flows are again active.

The two diagrams of FIGS. 4 and 5 share the same time axis. Until T1 both flows have the same bandwidth and backlogging counters. Since flow B becomes idle at T1, only the counters of flow A are increased up to T2. Note that the backlogging counter has an upper limit and instead of continuing to increase, all flows are decreasing their backlogging counters. Also note that the backlogging counter has a lower limit, Min Backlogging in FIG. 5. Also the charity counter CH of the port is increased, since flow A is the most aggressive flow and discards some packets. When both flows A and B offer bandwidth, only the flow having the smallest backlogging counter BL is accepted. At T2 flow B becomes active again and for a small period, T2 to T3, all the traffic of flow B is accepted while the backlogging counters of flow B is increased. Once the backlogging counters are equal, they share the bandwidth again.

Figure 6:
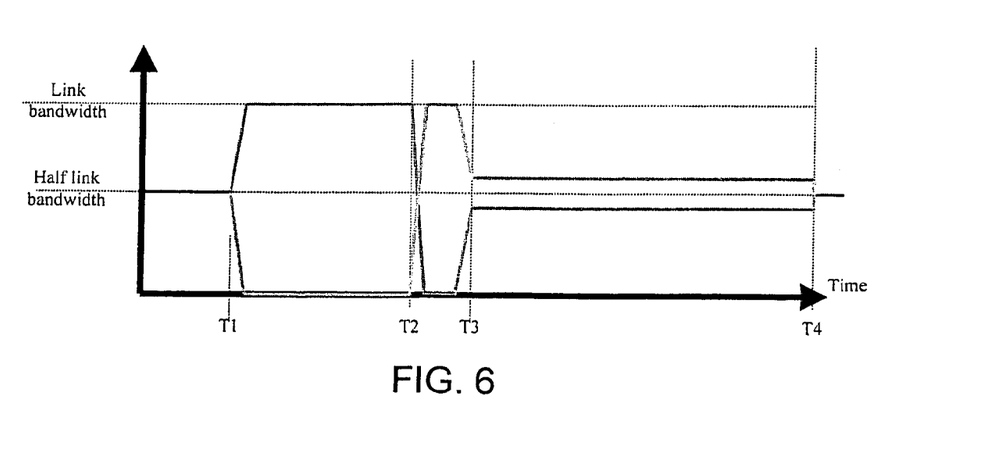
FIG. 6 is a diagram of experienced bandwidth associated with FIG. 4.

Between T3 and T4 the accepted bandwidth differs between flow A and B. Until they match, flow A is giving up a small portion of its bandwidth for flow B. Now the charity counter CH of the port is increased by flow A discarding some packets and decreased by flow B taking some packets. After T4 they share the line equally again. FIG. 6 shows the experienced bandwidth for both flows. All these diagrams have a somewhat broken time axis in order to show sensible figures. T2 and T3 are very close together (short term fairness) and T3 and T4 are much further apart (long term fairness).

As is indicated above, each time a packet is accepted each involved counter is increased in accordance with the table above. It is not necessary that the counters are limited, but it may be practical to set an upper limit to all counters, in order to keep the size of a counter to a suitable value. In order to reflect the relationship between all counters at all times and prevent overflow, all counters must be decreased when one of the counters in a category is close to the upper limit. Thus, when a counter in a group (e.g. all TC counters under a port) reaches a limit close to the physical size, a constant is subtracted from all the counters in this group.

The operation is also cyclical with respect to time. Each time unit the variables are updated with a corresponding parameter. That is, the parameters are subtracted from the respective variable to indicate that a certain amount of time has passed and that a certain amount of traffic is sent out.

Running through all algorithms results in that flags are set. So far, no decisions have been made whether to accept or reject the packet and now it is time to use all the flags. An example of the decision sequence is listed below. When the decision is taken the respective counters are incremented and the algorithms are repeated for the next packet.
1) If port is switched off, then reject. Otherwise:
2) If Flow Groups are enabled and Flow Group is fair, then accept. Otherwise:
3) If queue (VQLP, VQLTC) longer than DiscardWanted (=desired maximum length), then reject. Otherwise:
4) If Flow Groups are enabled and queue (VQLP, VQLTC) longer than DiscardPreferred (=preferred maximum length), and the most aggressive Flow Group, then reject. Otherwise:
5) If Traffic Classes are enabled and Traffic Class is fair, then accept. Otherwise:
6) If queue (VQLP, VQLTC) longer than DiscardPreferred (=preferred maximum length), then reject. Otherwise:
7) Accept.

Below is an example of the result of the bandwidth distribution among a set of traffic classes achieved by means of the present invention. Bandwidth is measured in percent for convenience.

|  | Traffic class configuration | | | | Accepted traffic | | |
|---|---|---|---|---|---|---|---|
|  | Guaranteed bandwidth | Weight | Maximum bandwidth | Incoming traffic | Accepted guaranteed traffic | Accepted weighted traffic | Total |
| Class A | 10% | 30 | 100% | 80% | 10% | 10% | 20% |
| Class B | 20% | 60 | 100% | 10% | 10% | 0% | 10% |
| Class C | 5% | 20 | 15% | 40% | 5% | 10% | 15% |
| Class D | 5% | 20 | 50% | 10% | 5% | 5% | 10% |
| Class E | 0% | 60 | 100% | 10% | 0% | 5% | 5% |
| Class F | 0% | 12 | 100% | 50% | 0% | 25% | 25% |
| Class G | 0% | 60 | 100% | 50% | 0% | 5% | 5% |
| Class H | 0% | 15 | 10% | 100% | 0% | 10% | 10% |
| Σ | 40% | — | — | — | 30% | 70% | 100% |

The classes above illustrate:

If a class has less offered than guaranteed bandwidths, all get through (class B).

If a class offers more than its maximum bandwidth it is not accepted (class H).

Two classes with exactly the same input traffic, receive bandwidth according to their weights, if there is competition (classes F and G). The bandwidth is distributed in inverse proportion to the weight value in the table.

The general bandwidth calculation for a class with both a minimum and maximum bandwidth as well as a weight is:

$$B = \min(\text{offered bandwidth}, BWTC_{max}, BWTC_{min} + WTC/\Sigma WTC \times BW_{spare})$$

(The distribution between flow groups is not shown in the table.)

The embodiments discussed above are only intended to be illustrative of the invention. The physical implementation in hardware and software and other embodiments may be devised by those skilled in the art without departing from the spirit and scope of the following claims.

What is claimed is:

1. A method for bandwidth scheduling in a switch comprising a switching fabric, and a bandwidth scheduler located before any queue of said switch, the method comprising the steps of:
receiving a stream of data from the switching fabric;
extracting flow identity information from the stream;
updating counters corresponding to the stream; and
subjecting the stream to a decision making algorithm in the bandwidth scheduler based on the extracted flow identity information and the undated counters for that particular stream resulting in that the stream is accepted or rejected before said stream enters any queue of said switch,
wherein the flow identity information includes port, identified by port number, and traffic class, and
wherein a limit ($BWP_{max}$) is set on the maximum accepted bandwidth per port and
wherein a virtual queue is associated with each port by means of a counter VQLP (virtual queue length of port) and the counter VQLP is increased with the packet length for each accepted packet and updated by subtracting the configuration parameter $BWP_{max}$ (maximum accepted bandwidth per port) each time unit.

2. A method for bandwidth scheduling according to claim 1, wherein, if the counter VQLP<a constant, a flag is set to a value used by the algorithm in deciding to accept or reject a packet.

3. A method for bandwidth scheduling in a switch comprising a switching fabric, and a bandwidth scheduler located before any queue of said switch, the method comprising the steps of:
receiving a stream of data from the switching fabric;
extracting flow identity information from the stream;
updating counters corresponding to the stream; and
subjecting the stream to a decision making algorithm in the bandwidth scheduler based on the extracted flow identity information and the updated counters for that particular stream resulting in that the stream is accepted or rejected before said stream enters any queue of said switch,
wherein the flow identity information includes port, identified by port number, and traffic class, and
wherein a limit ($BWTC_{max}$) is set on the maximum accepted bandwidth per traffic class, and
wherein a virtual queue is associated with each traffic class by means of a counter VQLTC (virtual queue length per traffic class) and the counter VQLTC is increased with the packet length for each accepted packet and updated each time unit by subtracting the configuration parameter $BWTC_{max}$.

4. A method for bandwidth scheduling according to claim 3, wherein, if the counter VQLTC<a constant, a flag is set to a value used by the algorithm in deciding to accept or reject a packet.

5. A method for bandwidth scheduling in a switch comprising a switching fabric, and a bandwidth scheduler located before any queue of said switch, the method comprising the steps of:
receiving a stream of data from the switching fabric;
extracting flow identity information from the stream;
updating counters corresponding to the stream; and
subjecting the stream to a decision making algorithm in the bandwidth scheduler based on the extracted flow identity information and the updated counters for that particular stream resulting in that the stream is accented or rejected before said stream enters any queue of said switch,
wherein the flow identity information includes port, identified by port number, and traffic class, and
wherein a counter TC (traffic class) is increased with the packet length when the traffic class accepts a packet, and a variable $TCP_{max}$ (traffic class port maximum) is set to a value equal to the maximum of the TC counters for the port in question, wherein, for a traffic class having the ratio $TC/TCP_{max}$<a constant, a flag is set to a value used by the algorithm in deciding to accept or reject a packet, whereby the bandwidth is distributed in accordance with the Max-Min algorithm.

6. A method for bandwidth scheduling according to claim 5, wherein a weight WTC (weight traffic class) is associated with each traffic class, so that the algorithm automatically prioritizes certain traffic classes.

7. A method for bandwidth scheduling according to claim 6, wherein the counter TC (traffic class) is increased with the packet length multiplied by the configuration parameter WTC (weight traffic class), when the traffic class accepts a packet, and the counter TC is updated each time unit by subtracting a configuration parameter $BWTC_{min}$ (bandwidth per traffic class minimum) multiplied by the configuration parameter WTC.

8. A method for bandwidth scheduling in a switch comprising a switching fabric, and a bandwidth scheduler located before any queue of said switch, the method comprising the steps of:
receiving a stream of data from the switching fabric;
extracting flow identity information from the stream;
updating counters corresponding to the stream; and
subjecting the stream to a decision making algorithm in the bandwidth scheduler based on the extracted flow identity information and the undated counters for that particular stream resulting in that the stream is accepted or rejected before said stream enters any queue of said switch,
wherein the flow identity information includes port, identified by port number, and traffic class, and
wherein each traffic class is guaranteed a bandwidth up to a limit ($BWTC_{min}$), and
wherein a counter TC (traffic class) is increased with the packet length when the traffic class accepts a packet and is updated each time unit by subtracting the configuration parameter $BWTC_{min}$ (bandwidth per traffic class minimum).

9. A method for bandwidth scheduling in a switch comprising a switching fabric, and a bandwidth scheduler located before any queue of said switch, the method comprising the steps of:
receiving a stream of data from the switching fabric;
extracting flow identity information from the stream;
updating counters corresponding to the stream; and
subjecting the stream to a decision making algorithm in the bandwidth scheduler based on the extracted flow identity information and the updated counters for that particular stream resulting in that the stream is accepted or rejected before said stream enters any queue of said switch,
wherein the flow identity information includes port, identified by port number, and traffic class, and
wherein, for each traffic class, a counter BL (backlogging) keeps track of how many packets are accepted in relation to the other traffic classes, so that if a previously idle traffic class becomes active, the traffic class is compensated by distributing more bandwidth to this traffic class.

10. A method for bandwidth scheduling according to claim 9, wherein a variable $BLP_{max}$ (backlogging port max) stores the maximum of the backlogging counters for the traffic classes of each port, and, for a traffic class with the ratio $BL/BLP_{max}$<a constant, a flag is set to a value used by the algorithm in deciding to accept or reject a packet.

11. A method for bandwidth scheduling according, to claim 10, wherein the BL counter is increased with the packet length multiplied by a configuration parameter WTC (weight traffic class), when the traffic class accepts a packet, and said counter BL is limited to a fixed upper value and a fixed lower value, and if one backlogging counter for a traffic class reaches the upper limit, all other counters are decreased in order to maintain the internal difference, and if one backlogging counter for a flow reaches the lower limit, this counter remains at the lower limit and the counter BL is updated each time unit by subtracting a configuration parameter $BWT_{min}$ (minimum bandwidth per traffic class) multiplied by the configuration parameter WTC.

12. A method for bandwidth scheduling in a switch comprising a switching fabric, and a bandwidth scheduler located before any queue of said switch, the method comprising the steps of:
receiving a stream of data from the switching fabric;
extracting flow identity information from the stream;
updating counters corresponding to the stream; and
subjecting the stream to a decision making algorithm in the bandwidth scheduler based on the extracted flow identity information and the updated counters for that particular stream resulting in that the stream is accepted or rejected before said stream enters any queue of said switch,
wherein the flow identity information includes port, identified by port number, and traffic class, and
wherein, if one traffic class is particularly aggressive or active, it is forced to give up a part of its accented bandwidth and
wherein, when a packet is accepted in a traffic class having the maximum accepted bandwidth ($TC=TCP_{max}$), a charity function forces the packet to be discarded and a counter charity (CH) is increased with a configurable fraction of the accepted packet length (+packet length×give factor), and when a packet is rejected in one of the other traffic classes, the charity function forces the packet to be accepted and the clarity counter (CH) is decreased with the packet length multiplied with the weight of the respective traffic class (−packet length×WTC), and the counter (CH) is updated each time unit by multiplication with a decay factor.

13. A method for bandwidth scheduling in a switch comprising a switching fabric, and a bandwidth scheduler located before any queue of said switch, the method comprising the steps of:

receiving a stream of data from the switching fabric;
extracting flow identity information from the stream;
updating counters corresponding to the stream; and
subjecting the stream to a decision making algorithm in the bandwidth scheduler based on the extracted flow identity information and the updated counters for that particular stream resulting in that the stream is accepted or rejected before said stream enters any queue of said switch,
wherein the flow identity information includes port, identified by port number, and traffic class, and, wherein:
a limit ($BWP_{max}$) is set on the maximum accepted bandwidth per port, a virtual queue is associated with each port, and a flag is set in dependence of the port queue length;
a limit ($BWTC_{max}$) is set on the maximum accepted bandwidth per traffic class, a virtual queue is associated with each traffic class, and a flag is set in dependence of the traffic class queue length;
the bandwidth is distributed in accordance with the Max-Min algorithm;
each traffic class is guaranteed a bandwidth up to a limit ($BWTC_{min}$);
a weight (WTC) is associated with each traffic class, so shat the algorithm automatically prioritizes certain traffic classes;
for each traffic class, a backlogging counter (BL) keeps track of how many packets are accepted in relation to the other traffic classes, so that if a previously idle traffic class becomes active, the traffic class is compensated by distributing more bandwidth to this traffic class;
if one traffic class is particularly aggressive or active, it gives up a part of its accepted bandwidth.

14. A method for bandwidth scheduling in a switch comprising a switching fabric, and a bandwidth scheduler located before any queue of said switch, the method comprising the steps of:
receiving a stream of data from the switching fabric;
extracting flow identity information from the stream;
updating counters corresponding to the stream; and
subjecting the stream to a decision making algorithm in the bandwidth scheduler based on the extracted flow identity information and the updated counters for that particular stream resulting in that the stream is accepted or rejected before said stream enters any queue of said switch,
wherein the flow identity information includes port, identified by port number, and traffic class, and,
wherein flows are grouped together by means of a hash function into a set of flow groups, and
wherein a counter FG (flow group) is increased with the packet length when the flow group accepts a packet, and a variable $FG_{max}$, (flow group maximum) is set to a value equal to the maximum of the FG counters for the traffic class in question, and wherein, for a flow group having the ratio $FG/FG_{max}$<a constant, a flag is set to a value used by the algorithm in deciding to accept or reject a packet, whereby the bandwidth is distributed in accordance with the Max-Min algorithm.

15. A method for bandwidth scheduling according to claim 14, wherein:
a limit ($BWP_{max}$) is set on the maximum accepted bandwidth per port, a virtual queue is associated with each port, and a flag is set in dependence of the port queue length;
a limit ($BWTC_{max}$) is set on the maximum accepted bandwidth per traffic class, a virtual queue is associated with each traffic class, and a flag is set in dependence of the traffic class queue length:
each traffic class is guaranteed a bandwidth up to a limit ($BWTC_{min}$;
a weight (WTC) is associated with each traffic class, so that the algorithm automatically prioritizes certain traffic classes;
for each traffic class, a backlogging counter (BL) keeps track of how many packets are accepted in relation to the other traffic classes, so that if a previously idle traffic class becomes active, the traffic class is compensated by distributing more bandwidth to this traffic class;
if one traffic class is particularly aggressive or active, it gives up a part of its accepted bandwidth.

16. A method for bandwidth scheduling according to claim 15, wherein the flags set by the algorithm logic are used in a decision sequence comprising:
if port is switched off, then reject, otherwise;
if Flow Groups are enabled and Flow Group is fair, then accept, otherwise;
if queue (VQLP, VQLTC) longer than Discard Wanted (=desired maximum length), then reject, otherwise if Flow Groups are enabled and queue (VQLP, VQLTC) longer than DiscardPreferred (=preferred maximum length), and the most aggressive Flow Group, then reject, otherwise
if Traffic Classes are enabled and Traffic Class is fair, then accept, otherwise;
if queue (VQLP, VQLTC) longer than DiscardPreferred (=preferred maximum length), then reject, otherwise:
accept.

17. A method for bandwidth scheduling according to claim 1, 3, 5, 8, 9, 12, 13, or 14, wherein the stream of data includes identifiable data packets:
subjecting each data packet to a decision making algorithm in the bandwidth scheduler resulting in that the data packet is accepted or rejected.

18. A method for bandwidth scheduling according to claim 2, 4, 5, 8, 7, 11, or 12, wherein flows are grouped together by means of a hash function into a set of flow groups, and a counter FG (flow group) is increased with the packet length when the flow group accepts a packet, and a variable $FG_{max}$ (flow group maximum) is set to a value equal to the maximum of the FG counters for the traffic class in question, and wherein, for a flow group having the ratio $FG/FG_{max}$<a constant, a flag is set to a value used by the algorithm in deciding to accept or reject a packet, whereby the bandwidth is distributed in accordance with the Max-Min algorithm.

19. An arrangement for bandwidth scheduling in a switch comprising a switching fabric, and a bandwidth scheduler located before any queue of said switch, the arrangement comprising:
means for receiving a stream of data from the switching fabric;
means for extracting flow identity information from the stream;
means for updating counters corresponding to the stream; and
means for subjecting the stream to a decision making algorithm in the bandwidth scheduler based on the extracted flow identity information and the updated counters for that particular stream resulting in that the stream is accepted or rejected before said stream enters any queue of said switch, wherein the flow identity information includes port, identified by port number, and traffic class, and, wherein a limit ($BWP_{max}$) is set on the maximum accepted bandwidth per port, and wherein a virtual queue is associated with each port by means of a counter VQLP (virtual queue length of port) and the counter VQLP is increased with the packet length for each accepted packet and updated by subtracting the configuration parameter $BWP_{max}$ (maximum accepted bandwidth per port) each time unit.

20. An arrangement for bandwidth scheduling according to claim 19, wherein, if the counter VQLP<a constant, a flag is set to a value used by the algorithm in deciding to accept or reject a packet.

21. An arrangement for bandwidth scheduling in a switch comprising a switching fabric, and a bandwidth scheduler located before any queue of said switch, the arrangement comprising:

means for receiving a stream of data from the switching fabric;

means for extracting flow identity information from the stream;

means for updating counters corresponding to the stream; and means for subjecting the stream to a decision making algorithm in the bandwidth scheduler based on the extracted flow identity information and the updated counters for that particular stream resulting in that the stream is accepted or rejected before said stream enters any queue of said switch, wherein the flow identity information includes port, identified by port number, and traffic class, and, wherein a limit ($BWTC_{max}$) is set on the minimum accepted bandwidth per traffic class, and wherein a virtual queue is associated with each traffic class by means of a counter VQLTC (virtual queue length per traffic class) and the counter VQLTC is increased with the packet length for each accepted packet and updated each time unit by subtracting the configuration parameter $BWTC_{max}$.

22. An arrangement for bandwidth scheduling according to claim 21, wherein, if the counter VQLTC<a constant, a flag is set to a value used by the algorithm in deciding to accept or reject a packet.

23. An arrangement for bandwidth scheduling in a switch comprising a switching fabric, and a bandwidth scheduler located before any queue of said switch, the arrangement comprising:

means for receiving a stream of data from the switching fabric;

means for extracting flow identity information from the stream;

means for updating counters corresponding to the stream; and means for subjecting the stream to a decision making algorithm in the bandwidth scheduler based on the extracted flow identity information and the updated counters for that particular stream resulting in that the stream is accepted or rejected before said stream enters any queue of said switch, wherein the flow identity information includes port, identified by port number, and traffic class, and wherein a counter TC (traffic class) is increased with the packet length when the traffic class accepts a packet, and a variable $TCP_{max}$ (traffic class port maximum) is set to a value equal to the maximum of the TC counters for the port in question, and wherein, for a traffic class having the ratio $TC/TCP_{max}$<a constant, a flag is set to a value used by the algorithm in deciding to accept or reject a packet, whereby the bandwidth is distributed in accordance with the Max-Min algorithm.

24. An arrangement for bandwidth scheduling according to claim 23, wherein a weight WTC (weight traffic class) is associated with each traffic class, so that the algorithm automatically prioritises certain traffic classes.

25. An arrangement for bandwidth scheduling according to claim 24, wherein the counter TC (traffic class) is increased with the packet length multiplied by the configuration parameter WTC (weight traffic class), when the traffic class accepts a packet, and the counter TC is updated each time unit by subtracting a configuration parameter $BWTC_{min}$ (bandwidth per traffic class minimum) multiplied by the configuration parameter WTC.

26. An arrangement for bandwidth scheduling in a switch comprising a switching fabric, and a bandwidth scheduler located before any queue of said switch, the arrangement comprising:

means for receiving a stream of data from the switching fabric;

means for extracting flow identity information from the stream;

means for updating counters corresponding to the stream; and means for subjecting the stream to a decision making algorithm in the bandwidth scheduler based on the extracted flow identity information and the updated counters for that particular stream resulting in that the stream is accented or rejected before said stream enters any queue of said switch, wherein the flow identity information includes port, identified by port number, and traffic class, and wherein each traffic class is guaranteed a bandwidth up to a limit ($BWTC_{min}$), and wherein a counter TC (traffic class) is increased with the packet length when the traffic class accepts a packet and is updated each time unit by subtracting the configuration parameter $BWTC_{min}$ (bandwidth per traffic class minimum).

27. An arrangement for bandwidth scheduling in a switch comprising a switching fabric, and a bandwidth scheduler located before any queue of said switch, the arrangement comprising:

means for receiving a stream of data from the switching fabric;

means for extracting flow identity information from the stream;

means for updating counters corresponding to the stream; and means for subjecting the stream to a decision making algorithm in the bandwidth scheduler based on the extracted flow identity information and the updated counters for that particular stream resulting in that the stream is accepted or rejected before said stream enters any queue of said switch, wherein the flow identity information includes port, identified by port number, and traffic class, and wherein, for each traffic class, a counter BL (backlogging) keeps track of how many packets are accepted in relation to the other traffic classes, so that if a previously idle traffic class becomes active, the traffic class is compensated by distributing more bandwidth to this traffic class.

28. An arrangement for bandwidth scheduling according to claim 27, wherein a variable $BLP_{max}$ (backlogging port max) stores the maximum of the backlogging counters for the traffic classes of each port, and, for a traffic class with the ratio $BL/BLP_{max}$<a constant, a flag is set to a value used by the algorithm in deciding to accept or reject a packet.

29. An arrangement for bandwidth scheduling according to claim 28, wherein the counter BL is increased with the packet length multiplied by a configuration parameter WTC (weight traffic class), when the traffic class accepts a packet, and said counter BL is limited to a fixed upper value and a fixed lower value, and if one backlogging counter for a traffic class reaches the upper limit, all other counters are decreased in order to maintain the internal difference, and if one backlogging counter for a flow reaches the lower limit, this counter will remain at the lower limit and the counter BL is updated each time unit by subtracting a configuration parameter $BWTC_{min}$ (minimum bandwidth per traffic class) multiplied by the configuration parameter WTC.

30. An arrangement for bandwidth scheduling in a switch comprising a switching fabric, and a bandwidth scheduler located before any queue of said switch, the arrangement comprising:
    means for receiving a stream of data from the switching fabric;
    means for extracting flow identity information from the stream:
    means for updating counters corresponding to the stream; and
    means for subjecting the stream to a decision making algorithm in the bandwidth scheduler based on the extracted flow identity information and the updated counters for that particular stream resulting in that the stream is accepted or rejected before said stream enters any queue of said switch,
    wherein the flow identity information includes port, identified by port number, and traffic class, and
    wherein, if one traffic class is particularly aggressive or active, it is forced to give up a part of its accented bandwidth, and
    wherein when a packet is accepted in a traffic class having the maximum accepted bandwidth ($TC=TCP_{max}$), a charity function forces the packet to be discarded and a counter charity (CH) is increased with a configurable fraction of the accepted packet length (+packet length× give factor), and when a packet is rejected in one of the other traffic classes, the charity function forces the packet to be accepted and the charity counter (CH) is decreased with the packet length multiplied with the weight of the respective traffic class (−packet length× WTC), and the counter (CH) is updated each time unit by multiplication with a decay factor.

31. An arrangement for bandwidth scheduling in a switch comprising a switching fabric, and a bandwidth scheduler located before any queue of said switch, the arrangement comprising:
    means for receiving a stream of data from the switching fabric;
    means for extracting flow identity information from the stream;
    means for updating counters corresponding to the stream; and
    means for subjecting the stream to a decision making algorithm in the bandwidth scheduler based on the extracted flow identity information and the updated counters for that particular stream resulting in that the stream is accepted or rejected before said stream enters any queue of said switch,
    wherein the flow identity information includes port, identified by port number, and traffic class, and wherein:
    a limit ($BWP_{max}$) is set on the maximum accepted bandwidth per port, a virtual queue is associated with each port, and a flag is set in dependence of the port queue length;
    a limit ($BWTC_{max}$) is set on the maximum accepted bandwidth per traffic class, a virtual queue is associated with each traffic class, and a flag is set in dependence of the traffic class queue length;
    the bandwidth is distributed in accordance with the Max-Min algorithm;
    each traffic class is guaranteed a bandwidth up to a limit ($BWTC_{min}$);
    a weight (WTC) is associated with each traffic class, so that the algorithm automatically prioritizes certain traffic classes;
    for each traffic class, a backlogging counter (BL) keeps track of how many packets are accepted in relation to the other traffic classes, so that if a previously idle traffic class becomes active, the traffic class is compensated by distributing more bandwidth to this traffic class;
    if one traffic class is particularly aggressive or active, it gives up a part of its accepted bandwidth.

32. An arrangement for bandwidth scheduling in a switch comprising a switching fabric, and a bandwidth scheduler located before any queue of said switch, the arrangement comprising:
    means for receiving a stream of data from the switching fabric:
    means for extracting flow identity information from the stream;
    means for updating counters corresponding to the stream; and
    means for subjecting the stream to a decision making algorithm in the bandwidth scheduler based on the extracted flow identity information and the updated counters for that particular stream resulting in that the stream is accepted or rejected before said stream enters any queue of said switch,
    wherein the flow identity information includes port, identified by port number, and traffic class, and
    wherein flows are grouped together by means of a hash function into a set of flow groups, and
    wherein a counter FG (flow group) is increased with the packet length when the flow group accepts a packet, and a variable $FG_{max}$ (flow group maximum is set to a value equal to the maximum of the FG counters for the traffic class in question, and wherein, for a flow group having the ratio $FG/FC_{max}$<a constant, a flag is set to a value used by the algorithm in deciding to accept or reject a packet, whereby the bandwidth is distributed in accordance with the Max-Min algorithm.

33. An arrangement for bandwidth scheduling according to claim 32, wherein:
    a limit ($BWP_{max}$) is set on the maximum accepted bandwidth per port, a virtual queue is associated with each port, and a flag is set in dependence of the queue length;
    a limit ($BWTC_{max}$) is set on the maximum accepted bandwidth per traffic class, a virtual queue is associated with each traffic class and a flag is set in dependence of the queue length; each traffic class is guaranteed a bandwidth up to a limit ($BWTC_{min}$);

a weight (WTC) is associated with each traffic class, so that the algorithm automatically prioritizes certain traffic classes;

for each traffic class, a backlogging counter (EL) keeps track of how many packets are accepted in relation to the other traffic classes, so that if a previously idle traffic class becomes active, the traffic class is compensated by distributing more bandwidth to this traffic class;

if one traffic class is particularly aggressive or active, it gives up a part of its accepted bandwidth.

34. An arrangement for bandwidth scheduling according to claim 33, wherein the flags set by the algorithm logic are used in a decision sequence comprising:

if port is switched off, then reject, otherwise;

if Flow Groups are enabled and Flow Group is fair, then accept, otherwise;

if queue (VQLP, VQLTC) longer than DiscardWanted (=desired maximum length), then reject, otherwise if Flow Groups are enabled and queue (VQLP, VQLTC) longer than DiscardPreferred (=preferred maximum length), and the most aggressive Flow Group, then reject, otherwise if Traffic Classes are enabled and Traffic Class is fair, then accept, otherwise;

if queue (VQLP, VQLTC) longer than DiscardPreferred (=preferred maximum length), then reject, otherwise;

accept.

35. An arrangement for bandwidth scheduling according to claim 19, 21, 23, 26, 27, 30, 31, or 32 wherein the stream of data includes identifiable data packets; and further comprising means for subjecting each data packet to a decision making algorithm in the bandwidth scheduler resulting in that the data packet is accepted or rejected.

36. An arrangement for bandwidth scheduling according to claim 20, 22, 23, 26, 25, 29, or 30, wherein flows are grouped together by means of a hash function into a set of flow groups, and a counter FG (flow group) is increased with the packet length when the flow group accepts a packet, and a variable $FG_{max}$ (flow group maximum) is set to a value equal to the maximum of the FG counters for the traffic class in question, and wherein, for a flow group having the ratio $FG/FG_{max}$<a constant, a flag is set to a value used by the algorithm in deciding to accept or reject a packet, whereby the bandwidth is distributed in accordance with the Max-Min algorithm.

* * * * *